United States Patent
Benson et al.

(10) Patent No.: US 10,110,559 B1
(45) Date of Patent: Oct. 23, 2018

(54) SYSTEM AND METHOD FOR WEB APPLICATION FIREWALL TUNNELING

(71) Applicant: JPMorgan Chase Bank, N.A., New York, NY (US)

(72) Inventors: Glenn Stuart Benson, Newton, MA (US); Christiaan Paul Akre, Jersey City, NJ (US); Russell M. Logar, Breezy Point, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 79 days.

(21) Appl. No.: 14/696,791

(22) Filed: Apr. 27, 2015

Related U.S. Application Data

(63) Continuation of application No. 13/529,419, filed on Jun. 21, 2012, now Pat. No. 9,043,893.

(60) Provisional application No. 61/576,724, filed on Dec. 16, 2011.

(51) Int. Cl.
*G06F 17/00* (2006.01)
*G06F 7/04* (2006.01)
*H04L 29/06* (2006.01)

(52) U.S. Cl.
CPC ........ *H04L 63/0236* (2013.01); *H04L 63/029* (2013.01)

(58) Field of Classification Search
CPC ........................ H04L 63/0236; H04L 63/029
USPC ....................... 726/11, 26; 713/153
See application file for complete search history.

(56) References Cited

U.S. PATENT DOCUMENTS

| | | | | |
|---|---|---|---|---|
| 9,043,893 B1 * | 5/2015 | Benson | ................ | H04L 63/029 726/11 |
| 2002/0107894 A1 * | 8/2002 | Kent, III | ............... | G06F 17/211 715/250 |
| 2003/0208748 A1 * | 11/2003 | Levin | ................ | G06F 9/45504 717/134 |
| 2004/0226002 A1 * | 11/2004 | Larcheveque | ...... | G06F 17/2247 717/126 |
| 2006/0143688 A1 * | 6/2006 | Futoransky | ........... | H04L 63/102 726/1 |
| 2009/0132950 A1 * | 5/2009 | Gibson | ............... | G06F 17/2725 715/780 |

(Continued)

OTHER PUBLICATIONS

Berners-Lee; RFC 2396, Uniform Resource Identifiers (URI): Generic Syntax; 1998; Retrieved from the Internet <URL: .ietf.org/rfc/rfc2396.txt.pdf>; pp. 1-40 as printed.

(Continued)

*Primary Examiner* — Aravind K Moorthy
(74) *Attorney, Agent, or Firm* — Hunton Andrews Kurth LLP

(57) ABSTRACT

Systems and methods for web application firewall tunneling are disclosed. In one embodiment, the method may include (1) receiving a plurality of characters entered by a user into a field of a HTML page that is executed in a client runtime environment of a client device; (2) executing a client tunneling application to encode at least some of the characters; (3) passing the plurality of characters through the web application firewall; (4) executing a server tunneling application to decode the encoded characters; and (5) providing the plurality of characters, including the decoded characters, to a host application. Parts of the method may be performed by at least one computer processor.

4 Claims, 3 Drawing Sheets

(56) References Cited

U.S. PATENT DOCUMENTS

2010/0306184 A1* 12/2010 Wang .................... H04L 63/02
707/707
2012/0166196 A1* 6/2012 Ju .......................... G10L 15/19
704/254

OTHER PUBLICATIONS

No stated author; W3C-17 Forms; Apr. 2010; Retrieved from the Internet <URL: web.archive.org/web/20100421194849/http://www.w3.org/TR/html401/interact/forms.html/>; pp. 1-23 as printed.

No stated author; Microsoft-How VPN Works; Mar. 2003; Retrieved from the Internet <URL: technet.microsoft.com/en-us/library/cc779919(v=ws.1O).aspx#w2k3tr_vpn_how_niuh>; pp. 1-22 as printed.

Hinchliffe et al., The Web as a Legacy Computer System Application Interface, 1997, Retrieved from the Internet <URL:chapelhill.homeip.net!horton/CiTR/intranet/1nformation_Centre/Tech_Journals/Journal_copy/CiTR_Technical_Journal_1997.html>, pp. 1-9 as printed.

Wheeler, Secure Programming for Linux and Unix HOWTO, 2003, Retrieved from the Internet <URL: dwheeler.com/secure-programs/Secure-Programs-HOWTO/>, pp 1-9 as printed.

Futoransky et al., A dynamic technique for enhancing the security and privacy of web applications, 2007, Retrieved from the Internet <URL: coresecurity.com/publication/dynamic-technique-enhancing-security-and-privacy-web-applications>, pp. 1-16 as printed.

JavaScript: Form Validation, 2006, Retrieved from the Internet <URL: web.archive.org/web/20061109002803/http://www.webcheatsheet.com/javascript!form_validation.php?>, pp. 1-6 as printed.

Brabrand et al., Dual syntax for XML languages, 2008, Retrieved from the Internet <URL: sciencedirect.com/science/article/pii/S0306437908000057>, pp. 1-22 as printed.

Suwartadi et al.; First Step Toward Internet Based Embedded Control System; 2004; Retrieved from the Internet <URL: ieeexplore.ieee.org/xpl/articleDetails.jsp?arnumber=1426814>; pp. 1-6 as printed.

* cited by examiner

| URL | name | actions |
|---|---|---|
| * | passwd | tunnel-c64 encode-sql |
| /url1 | username | filter/\W/ |
| /handle | message | tunnel-c64 encode-html encode-sql |
| /submit | * | block-blacklist encode-sql |
| * | * | block-blacklist |

FIGURE 3

SYSTEM AND METHOD FOR WEB APPLICATION FIREWALL TUNNELING

RELATED APPLICATIONS

This patent application is a continuation of U.S. patent application Ser. No. 13/529,419, now U.S. Pat. No. 9,043,893, filed Jun. 21, 2012, which claims priority to U.S. Provisional Patent Application Ser. No. 61/576,724, filed Dec. 16, 2011, the disclosures of which are incorporated by reference in their entireties.

BACKGROUND OF THE INVENTION

1. Field of the Invention

The present invention generally relates to web application firewall tunneling.

2. Description of the Related Art

At some point in its lifecycle, almost every application has had a security defect that is caused by improper validation of input parameters. For Internet-accessible web applications, these vulnerabilities can expose an organization, and its systems, to the world.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts an example rules file according to one embodiment.

SUMMARY OF THE INVENTION

Figure 1:
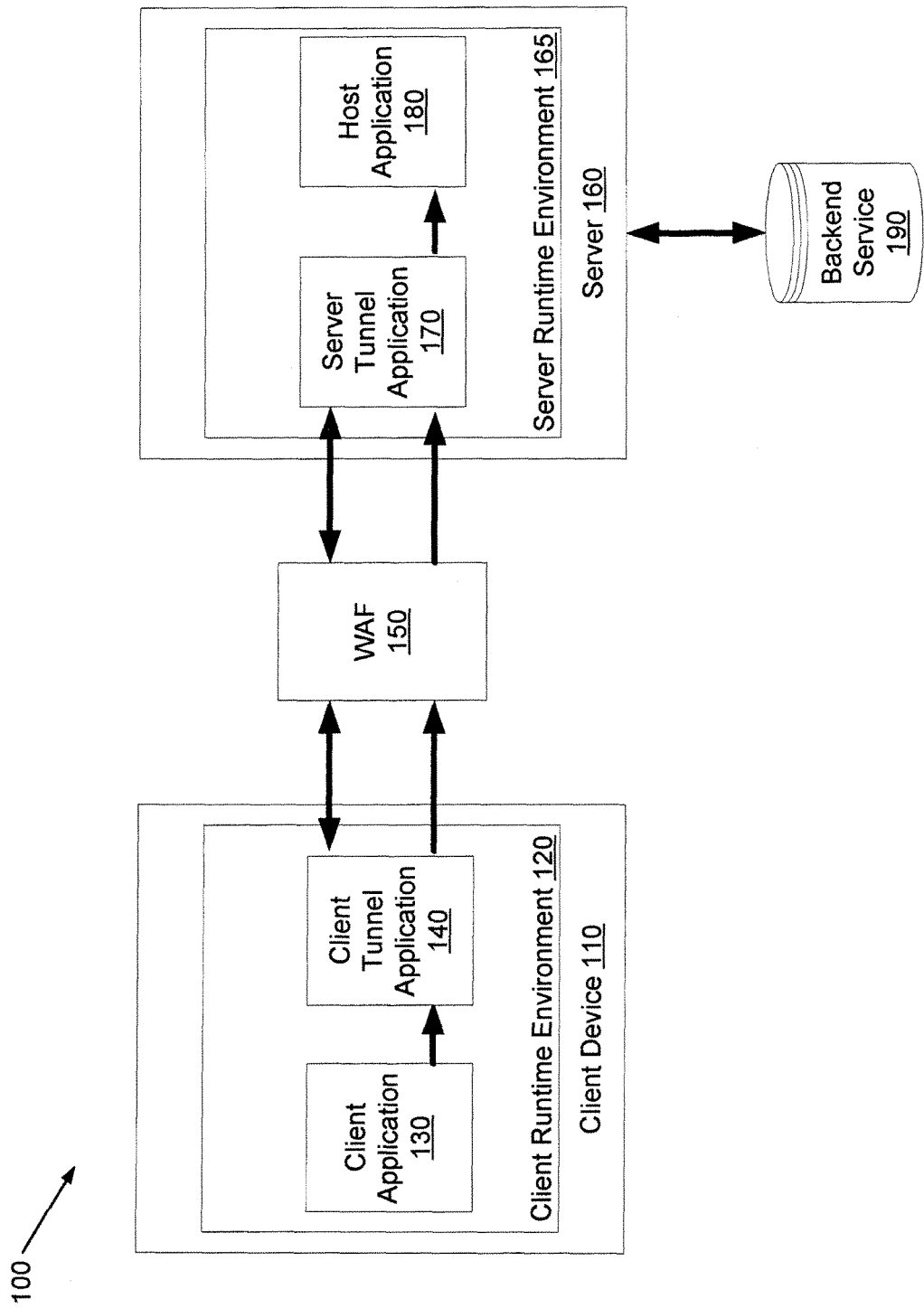
FIG. 1 is a block diagram of a system for web application firewall tunneling according to one embodiment.

Systems and methods for web application firewall tunneling are disclosed.

According to one embodiment, a method for tunneling through a web application firewall includes configuring a tunneling application, which may include establishing a rules file; receiving data at a client runtime environment; encoding at least some of the data; passing the data, including the encoded data, through the web application firewall; decoding the encoded data; and providing the data to a desired application. The method may further include escaping the decoded data.

In one embodiment, the client runtime environment further may include JavaScript to take a desired action in response to entered data.

In another embodiment, a method for providing web application firewall protection selectable on a form field-by-form field basis without configuring the web application firewall is disclosed.

In still another embodiment, a method for providing error reporting to the user before web application firewall protection is disclosed.

In still another embodiment, a method for tunneling through a web application firewall is disclosed. The method may include (1) receiving a plurality of characters entered by a user into a field of a HTML page that is executed in a client runtime environment of a client device; (2) executing a client tunneling application to encode at least some of the characters; (3) passing the plurality of characters through the web application firewall; (4) executing a server tunneling application to decode the encoded characters; and (5) providing the plurality of characters, including the decoded characters, to a host application. Parts of the method may be performed by at least one computer processor.

The step of executing a client tunneling application to encode at least some of the characters may include using the at least one computer processor, determining if any of the characters should be encoded; and using the at least one computer processor, executing a transformation algorithm to encode the characters that are to be encoded.

In one embodiment, the transformation algorithm encodes characters that are identified as unsafe characters. The unsafe characters may include ' ` : ( ) [ < > * ; - \ ] and =. The identification of unsafe characters may be stored in a file.

In one embodiment, the transformation algorithm may be a BASE64 algorithm, or may be based on a BASE64 algorithm.

The method may further include escaping at least the decoded characters.

In one embodiment, the HTML page may be provided to the client device by the host application.

In another embodiment, a method for providing web application firewall protection selectable on a form field-by-form field basis without configuring the web application firewall is disclosed. The method may include (1) providing, on a client device, a HTML page associated with host application executed on a server, the HTML page having at least one form field; (2) receiving, at the client device, a plurality of characters into the form field; (3) using at least one computer processor at the client device, executing a client tunneling application to determine whether to encode any of the characters; (4) using the at least one computer processor at the client device, executing a transformation algorithm to encode at least some of the characters; (5) passing the plurality of characters through the web application firewall; (6) using at least one computer processor at the server, executing a server tunneling application to decode the encoded characters; (7) using the at least one computer processor at the server, escaping at least the decoded characters; and (8) providing the plurality of characters, including the escaped characters, to a host application.

The method may further include using the at least one computer processor at the client device, evaluating that data on a character-by-character basis; and using the at least one computer processor at the client device, executing an action if a character is a prohibited character. The action may include displaying the entered character in the field, not displaying the character in the form field, and/or providing an alert that the character is improper.

The method may further include receiving, at the client device, a HTML page comprising the plurality of characters, including the escaped characters; and using the at least one computer processor at the client device, unescaping the escaped characters.

In one embodiment, the client tunneling application may encode at least the following characters: ' ` : ( ) [ < > * ; - \ ] and =.

In one embodiment, the client tunneling application may access a rules file to determine whether to encode any of the characters. The rules file may include an identification of unsafe characters, an identification of a form field that will be encoded, etc.

In another embodiment, a method for providing web application firewall protection is disclosed. The method may include (1) receiving a plurality of characters entered by a user into a field of a HTML page that is executed in a client runtime environment of a client device; (2) using at least one computer processor, evaluating the characters to identify a prohibited character; and (3) using the at least one computer processor, executing an action in response to the identification of a prohibited character. The action may include briefly displaying the character in the field, not displaying the entered character in the field, and/or providing an alert that the entered character is improper.

The method may further include passing the plurality of characters through a web application firewall.

In one embodiment, the characters may be evaluated on a character-by-character basis, on a word-by-word basis, etc.

DETAILED DESCRIPTION OF PREFERRED EMBODIMENTS

Figure 2:
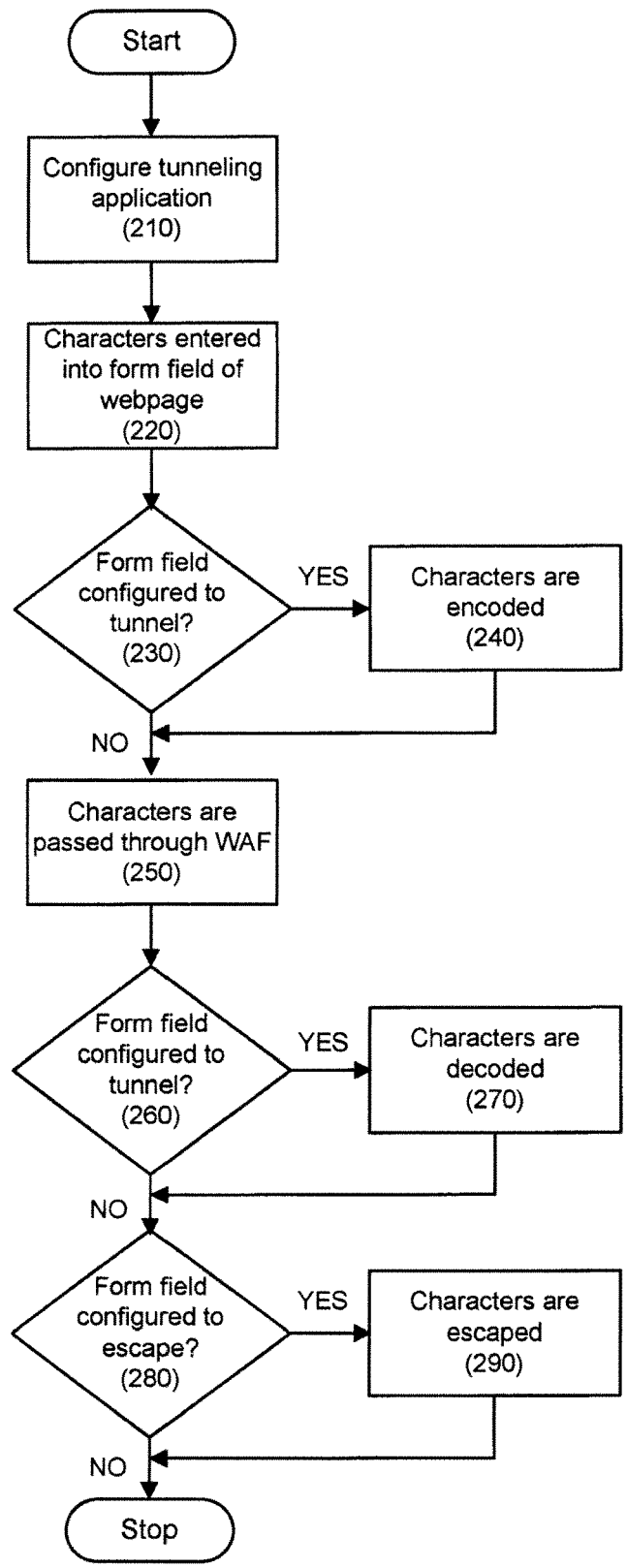
FIG. 2 is a flowchart depicting a method for web application firewall tunneling according to one embodiment.

Several embodiments of the present invention and their advantages may be understood by referring to FIGS. 1-3, wherein like reference numerals refer to like elements.

Many types of attacks exploit the improper validation of parameters. These include, for example, Cross-Site Scripting (XSS) attacks, SQL injection, etc. A common avenue of attack is a form field of a web page.

A form field is an individual entry element of a form, such as a webpage. The "last name" field is an example of a form field. Adversaries often attack an application by entering unexpected data into a form field. Instead of entering a legitimate last name, an adversary may potentially enter a computer program or executable script using, for example, special characters that are recognized by the computer programming language, such as "#", "<", and ">".

A Web Application Firewall (WAF) is a computer system that protects against application-level attacks. A WAF filters and stops attacking HTTP, or HTTPS, requests before those requests reach an application. In one embodiment of the invention, the WAF deployment is a stand-alone device separated from the server which implements the overwhelming majority of the business logic. In another embodiment, the WAF and the server operating the business logic are separated by a conventional firewall, where the WAF resides in a Demilitarized Zone (DMZ), and the server operating the business logic resides in an internal network. In another embodiment, the WAF and the server operating the business logic reside in the same physical machine.

WAFs are available from, for example, Barracuda Networks, Inc.

If the application has no WAF or other external means of protecting against application-level attacks, then the application has the responsibility to implement, configure, and test the entire application from all possible attacks.

WAFs generally improve security. By improving security, however, an application may be prohibited from exhibiting a desired functionality. Conversely, by decreasing security to allow a greater degree of desired functionality in the application, an application architect may inadvertently allow vulnerabilities through which an adversary may attack.

Referring to FIG. 1, a system for web application firewall tunneling is disclosed. System 100 may include client device 110, web application firewall (WAF) 150, server 160, and backend service 190. In one embodiment, client device may be any computing device, such as a desktop computer, laptop computer, notebook computer, mobile telephone, PDA, tablet computer, etc. Client device 110 may provide client runtime environment 120, which may be a browser.

In one embodiment, backend server 190 may be a database, a message queue, a SOAP API, etc.

In one embodiment, client device 110 may be provided with client tunnel application 140. Client tunnel application 140 may be executed by client runtime environment 120 and/or client device 110 and may function as the "entry point" for tunneling data through the WAF. In one embodiment, client tunnel application 140 may be a JavaScript script.

In one embodiment, client tunnel application 140 may access, or include, a library of characters that are considered to be unsafe for host application 180. In one embodiment, this library may be stored in a separate database (not shown).

Server 160 may be any suitable server. Server 160 may provide server runtime environment 160, which may be a web application container. In one embodiment, server 160 may execute, or support, host application 180. Host application 180 may support client application 130 that is displayed in client runtime environment 120. For example, host application 180 may export at least one web page having at least one form field to client application 130.

Server tunnel application 170 may serve as an exit for data that is passed through WAF 150. For example, in one embodiment, server tunnel application 170 may be a Java filter servlet.

In one embodiment, client tunnel application 140 and server tunnel application 170 may be programs that perform a desired action to permit the "tunneling," or passing, of the data through WAF 150. For example, in one embodiment, client tunnel application 140 and server tunnel application 170 may encode and decode, respectively, characters that entered into a form field of a webpage presented by client runtime environment 120. In another embodiment, client tunnel application 140 and server tunnel application 170 may transpose these characters. Other actions may be taken by client tunnel application 140 and server tunnel application 170, respectively In one embodiment, the configuration of WAF 150 may be the same regardless of whether zero tunnels exist, one tunnel, or multiple tunnels. In one embodiment, tunnels may be built in application software deployed at client tunnel application 140 and server tunnel application 170. In one embodiment, a sequence of bits that passed to client tunnel application 140 may be exactly the same as the sequence of bits at server tunnel application 170. At the points between client tunnel application 140 and server tunnel application 170, the bits may be transformed using, for example, a transformation algorithm.

In one embodiment, the transformation algorithm that may be implemented at client tunnel application 140 is a BASE64 encode; and the transformation algorithm that may be implemented at server tunnel application 170 is a BASE64 decode. In another embodiment, the transformation algorithm may be a slightly modified BASE64 encode/decode that does not produce the equals (=) character, but instead substitutes the underscore (_) wherever BASE64 produces the equals character. In this embodiment, the characters produced by the algorithm are: ABCDEFGHIJKLMNOPQRSTUVWXYZabcdefghijklmnopqrstuvwxyz01234 56789+/_. These characters are generally considered to be "safe" by security architects because they do not participate in attacks. Thus, WAF 150 will not block any of these characters and as a result the tunnel passes through the WAF without disruption.

In another embodiment, a character that may have been previously considered to be "safe" may actually be considered "unsafe" based on additional analysis or new attacks. Thus, if WAF 150 is modified to stop these characters, another modification to the encode/decode algorithm may be necessary. For example, if the "+" character is no longer safe, but "}" character is safe, the WAF may be configured to stop the "+" character, and the encode/decode algorithm may be modified to replace the "+" with the "}" character.

Thus, WAF 150 protects all the form fields from all characters on its prohibited list. All of the non-tunneled form fields are safe, and the received characters may pass to host application 180 without benefiting from further security. Form fields that are tunneled, however, may not benefit from WAF 150. In one embodiment, additional protections may be provided at server tunnel application 170.

For example, in one embodiment, client tunnel application 140 and/or server tunnel application 170 may perform "escaping" on the decoded data. "Escaping" is the process of altering data from the original, potentially unsafe representation to a format appropriate for the final disposition that is likely to be safe.

If escaping were not performed, then the data input in client runtime environment 120 would eventually appear in that identical form in host application 180, which could expose host application 180 to attack. When characters are escaped, however, the result is useful to application host 180, but the characters may exist in a different form than was entered in client runtime environment 120.

An example of an escaping operation is as follows. Suppose a user enters the potentially unsafe "<script>" into a tunneled form field, with the "<" and ">" characters being potentially unsafe characters. If escaping were not performed, following decoding, host application 180 would receive the same potentially unsafe "<script>". With escaping, however, "<script>" may be escaped into "<script>" or a similar representation, which may be provided to host application 180. In other words, the host application 180 receives: "<script>".

In one embodiment, escaping may be performed by server tunnel application 170 after the decoding operation. In another embodiment, escaping may be performed by client tunnel application 140 prior to encoding. In another embodiment, escaping may be performed as part of the encoding and/or decoding process.

Following "escaping," an "unescaping" option may be performed. For example, if a user decides to request a report showing all of the information that was entered, host application 180 may generate a HTML page that contains the data "< script>" and sends that HTML page to client runtime environment 120. Client runtime environment 120 executes an unescape operation, such that when the client runtime environment has a HTML page with "< script>" the user may be shown "<script>".

In one embodiment, host application 180 may not be exposed to an unescaped version of the entered data.

In one embodiment, the server configuration may control the operation of client tunnel application 140 and/or server tunnel application 170. In one embodiment, the server configuration may be defined in the rules file.

The transmission of data (whether encoded or unmodified data) may be over the native client-server transport mechanism (generally HTTP, and specifically HTTPS (HTTP over a SSL connection for security)).

In one embodiment, client tunnel application 140 may intercept some, or all, requests made to host application 180, and may modify each request before it reaches host application 180. In one embodiment, some, or every, parameter of a request from client runtime environment 120 may have a defined set of modifications applied to it. Thus, in one embodiment, host application 180 may receive a sanitized and formatted version of the original parameter. Invalid input entered by a malicious user may either be silently deleted, or return a generic error page.

In one embodiment, client tunnel application 140 may inject script, such as Javascript or a similar program/script, into web pages to filter out unwanted input as the user types. For example, if the user presses a key for a prohibited character, the character may not be displayed in the form field and no corresponding character may be entered into the form field. In another embodiment, the character may be displayed in the form field, and then deleted so that the user can see that the entry was received. In another embodiment, client device 110 may provide feedback, such as a noise (e.g., a "beep") or a visual clue. In one embodiment, the client runtime environment may provide feedback as to why the key is not accepted, such as a message indicating that an invalid key was pressed.

This code may also perform semantic validation and input formatting.

Referring to FIG. 2, a method for web application firewall tunneling is disclosed. In step 210, the client tunnel application and/or the server tunnel application may be configured. This may include identifying any form field(s) that will "tunnel" through the WAF. In another embodiment, this may include an identification of special characters that are permitted to be entered. In another embodiment, this may further include an identification of restricted characters that will not be accepted.

In one embodiment, this may also include establishing the actions that will be taken as data is entered into the form fields of a webpage, etc. For example, prohibited characters may not be displayed in the form field as they are entered by a user, a sound may play, a message may be displayed, etc.

In one embodiment, a rules file may establish information about the input parameters that the application may accept. Inputs may be identified by, for example, a unique combination of URL and name. For each input, the user may specify one or more actions to be performed.

An example rules file is provided in FIG. 3. The rules file is a collection of rules. A rule is a number of conditions, associated with a number of actions. For each discrete atom of user input the rules are iterated in sequential order from start to end, and the first rule where all conditions are matched is selected. Each action in the selected rule is executed in sequence, with the user's input provided as a parameter to the action execution.

In this embodiment, the conditions are http/https request url and parameter name, and the actions are allowing whitelisted input, blocking black-liststed input, or tunneling input through a web application firewall.

Referring again to FIG. 2, in step 220, a character or characters are entered in, for example, a form field of a webpage provided by a client application executed in a client runtime environment, such as a browser.

In step 230, if the form field is configured for tunneling, in step 240, as characters are entered, or after all characters are entered, an appropriate action may be taken.

In one embodiment, the actions may include filtering unwanted characters (e.g., stop the user from entering the character), encoding certain characters so they can pass, or "tunnel" through, the WAF (e.g., the WAF is configured to stop all unsafe characters), and formatting inputs so they can be safely stored in databases or displayed on web pages without risking exposure (e.g., escaping the unsafe characters). Other actions may be used as necessary and/or desired.

In one embodiment, any action taken may be on a character-by-character basis (i.e., all characters do not necessarily exhibit the same behavior), on a word-by-word basis, etc. For example, in one embodiment, some characters may be blocked. In another embodiment, some characters may be encoded. In still another embodiment, some characters are passed to the application unmodified.

In one embodiment, if a single character on a form field is blocked, for example, by the client tunnel application and/or the WAF, then the entire input into the form field may be blocked until the user deletes all the characters and re-enters.

In another embodiment, a blocked character may not be displayed in the form field.

In one embodiment, a "http request" that is received by the application is first processed and transmitted by the client runtime environment. The URL for the request may be determined, and then combined with each parameter name to find the appropriate rule. Each action execution may be performed in sequence, resulting in either a formatted, sanitized, and validated string, or an error. An error, however, may stop action execution and prevent the remainder of the actions from being executed.

In order to reconfigure the client for the host application that is displayed in the client runtime environment, the injected JavaScript may need to be instructed as to what actions (e.g., tunnel, not tunnel, etc.) it will take with each form. The URL for the form action is determined and may be combined with each parameter name to find the appropriate rule. Each form field may be modified to have onKeyUp (release of keyboard key) and onChange (change in content) events that modify the input.

For example, each HTML input element may have an event handler associated with the client runtime environment onKeyUp and onChange events. This event handler may be written in Javascript. This event handler utilizes the current contents of the HTML input element as an input parameter. This event handler may have the ability to modify the input entered by the user. The behavior of this event handler may be controlled by the rules file.

For example, for each form field of a webpage, if a tunnel is not established, then the WAF will evaluate each character input into the form field and determines whether to reject. If a tunnel is established, then all characters pass through the WAF and the WAF blocks nothing. Thus, all characters pass to the server tunnel application.

The client tunnel application may implement a decision to determine which form fields require a tunnel. This may be based on, for example, the rules file. If tunneling is desired, the entered characters may be encoded. If tunneling is not desired, the entered characters may pass through the WAF unmodified. In one embodiment, the WAF may have no visibility into the rules file.

For example, a "name" field and "telephone number" field may prompt the user to enter a name and a telephone number. The client tunnel application may be pre-programmed by, for example, the rules file, to tunnel the contents of the name field, but not the contents of the telephone field Thus, the client tunnel application may instruct the client tunnel application to apply a modified BASE64 transformation of the contents of the name field.

Other encoding algorithms may be used as necessary and/or desired.

In this example, because the rules file establishes that the telephone number field is not tunneled, the client tunnel application will not encode the telephone number, and this form field passes through the WAF. Characters that are not numeric characters may be prohibited from being entered.

In step 250, the characters are passed through the WAF. The encoded characters from a tunneled form field should pass through the WAF without incident. The exception occurs when a user hacks by entering an unsafe character into the encoded sequence of characters, and then the WAF may block the entire HTTP request.

In one embodiment, the transformation algorithm may never produce a character that is contained in the pre-identified list of special characters, referred to as the list of unsafe characters. This list may be stored in, for example, a library at the client device. Thus, the WAF never identifies any pre-identified special character in a transformed field because the transformation never produces a pre-identified special character.

Characters that are from non-tunneled form fields will be subject to evaluation and screening by the WAF.

In the example above, the encoded characters from the "name" field should pass through the WAF to the server tunnel application. The characters for the "telephone number" field, however, are evaluated by the WAF. The WAF may evaluate the characters to look for attack sequences. In one embodiment, the WAF may look for attack sequences which contain one of a pre-identified list of special characters known to be used in attacks. An exemplary list of pre-identified special characters includes " ' : ( ) [ < > * ^ ; - \ and =.

In step 260, if the form field was configured for tunneling, in step 270, the encoded characters from tunneled form fields are decoded using a decoding algorithm corresponding to the encoding algorithm by the server tunnel application. In one embodiment, the server tunnel application may protect against an attack whereby an attack modifies the decisions made in the client tunnel application. If the attacker chooses to tunnel fields that were not supposed to be tunneled then the server tunnel application may identify the incorrectly tunneled fields.

In one embodiment, the server tunnel application may reference a configuration file that resides on the server that identifies which fields should be tunneled. In one embodiment, the server tunnel application may differentiate between incoming data which has been tunneled, and incoming data which has not been tunneled, and then compares against expectations as encoded in the configuration file residing in the server. In one embodiment, the server tunnel application program may determine which fields have been tunneled by searching for pre-defined character sequences not normally used in non-tunneled data.

In step 280, if the form field is configured for escaping, in step 290, an escaping operation, as described above, may be performed.

In one embodiment, the client tunnel application may execute steps 230 and 240; software that operates the WAF may execute step 260; and the server tunnel application may execute steps 260, 270, 280, 290, and any additional application processing.

In one embodiment, the decision in step 260 is the same as the decision in step 230. In other words, if the decision in 230 is "yes" (e.g., that the form field requires tunneling), then the decision in step 260 is also "yes." Similarly, if the decision in step 230 is "no" (e.g., that the form field does not require tunneling), then the answer in step 260 is also "no."

In one embodiment, if the answer is "no," and the user enters an unsafe character anywhere in the form field, then the WAF blocks that character. If the answer is no, and the user manually encodes, then the characters are not decoded, and the host application will process encoded data. If the answer is "yes," but the user manually overrides the encoding (user hacks) and inserts an unsafe character, then the WAF blocks that character(s).

The use of tunneling with the WAF provides flexibility for providing security. The WAF is independent of the host application, thereby offering an opportunity for independent development. A vendor may potentially optimize a WAF for security without any knowledge of its customers' applications. The vendor has the opportunity to focus on a team populated by security professionals, while the host application's development team may have other expertise.

One may apply Quality Assurance and Penetration Testing to a WAF independently of the host application. Quality Assurance teams tend to lack security expertise, except when offered by a dedicated security vendor. So, a WAF solution that offers a central Quality Assurance team trained in security techniques may yield the best security results.

A WAF may be independent of the programming language or environment of the host application. An enterprise may need multiple libraries to cover disparate languages and environments. While the library and the WAF may potentially offer similar functionality, the WAF's repeatable architecture may yield the highest level of security quality.

The WAF may provide an easier means of audit and a central point of governance. An independent auditor can evaluate WAF to determine if its configuration is secure. Although the auditor may also look at the library linked with each application, the audit function on the library may be much more difficult.

If the WAF requires tunnels, then the auditor may identify the tunnels purely through observing the software loaded into a client runtime environment. The ability to perform a tunnel audit without peering into the server is an advantage.

Some applications may not require any tunnels. In this case, the host application benefits from protection against all attacks by simply residing behind a correctly configured WAF.

In general, WAFs provide relatively poor error reporting. The WAF may provide an error page whenever it detects an attack. In some cases, the user may inadvertently execute an attack through user error. Since the WAF is independent of the application, the WAF's error page does not fit well into the application's ergonomics.

In one embodiment, this may be addressed by a tunneling client, or separate client-side software, that detects attacks and reports those attacks to the user. This client-side software may not provide security functionality because an adversary may easily bypass client-side software. However, the client-side software may assist the application by providing excellent ergonomics of error reporting.

The contents of the following patents and patent applications are hereby incorporated, by reference, in their entireties: U.S. patent application Ser. No. 10/882,527; U.S. patent application Ser. No. 11/411,576; U.S. patent application Ser. No. 12/826,311; and U.S. patent application Ser. No. 13/168,148.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for providing web application firewall protection, comprising:
   receiving a plurality of characters individually entered by a user into a field of a HTML page that is executed in a client runtime environment of a client device, the client device on a client side of a web application firewall;
   as each character is entered:
      at least one computer processor evaluating the character to identify a prohibited character; and
      the at least one computer processor executing an action in response to the character being identified as a prohibited character, wherein the action includes one of briefly displaying the character in the field and not displaying the entered character in the field;
      the at least one computer processor displaying the character in response to the character not being identified as a prohibited character; and
   passing the plurality of characters entered into the field through the web application firewall to a server on a server side of the web application firewall.

2. The method of claim 1, wherein an identification of prohibited characters is stored in a file.

3. A system for providing web application firewall protection, comprising:
   a client device comprising at least one computer processor executing a client application in a client runtime environment;
   a server executing a host application associated with the client application in a server runtime environment; and
   a web application firewall between the client device and the server device, wherein the client device is on a client side of the web application firewall;
   wherein:
      the client application receives a plurality of characters individually entered by a user into a field of a HTML page;
      as each character is entered, the client application evaluates the character to identify a prohibited character and executes an action in response to the character being identified as a prohibited character, wherein the action includes one of briefly displaying the character in the field and not displaying the entered character in the field;
      the client application displays the character in response to the character not being identified as a prohibited character; and
      the client application passes the plurality of characters entered into the field through the web application firewall to a server on a server side of the web application firewall.

4. The system of claim 3, further comprising:
   a file comprising an identification of prohibited characters is stored in a file that is stored on the client device.

* * * * *